United States Patent
Novel et al.

(10) Patent No.: US 11,480,661 B2
(45) Date of Patent: Oct. 25, 2022

(54) DETERMINING ONE OR MORE SCANNER POSITIONS IN A POINT CLOUD

(71) Applicant: Bentley Systems, Incorporated, Exton, PA (US)

(72) Inventors: Cyril Novel, Paris (FR); Alexandre Gbaguidi Aisse, Suresnes (FR)

(73) Assignee: Bentley Systems, Incorporated, Exton, PA (US)

( * ) Notice: Subject to any disclaimer, the term of this patent is extended or adjusted under 35 U.S.C. 154(b) by 549 days.

(21) Appl. No.: 16/529,985

(22) Filed: Aug. 2, 2019

(65) Prior Publication Data
US 2020/0371214 A1    Nov. 26, 2020

(30) Foreign Application Priority Data
May 22, 2019   (EP) .................................... 19305648

(51) Int. Cl.
*G01S 7/481* (2006.01)
*G06T 7/73* (2017.01)
(Continued)

(52) U.S. Cl.
CPC ............ *G01S 7/4817* (2013.01); *G01S 7/497* (2013.01); *G01S 17/42* (2013.01); *G01S 17/89* (2013.01);
(Continued)

(58) Field of Classification Search
CPC ........ G01S 17/42; G01S 17/89; G01S 7/4817; G01S 7/497; G06T 7/60; G06T 7/73; G06T 2207/10028
(Continued)

(56) References Cited

U.S. PATENT DOCUMENTS

| 6,512,518 | B2* | 1/2003 | Dimsdale | G01B 11/24 345/427 |
| 8,314,794 | B2 | 11/2012 | Paulsen | |

(Continued)

FOREIGN PATENT DOCUMENTS

| WO | 2015200782 | 12/2015 |
| WO | 2019060450 | 3/2019 |

OTHER PUBLICATIONS

Abmayr T et al., "Calibration and registration framework for 3D reconstruction of the Kirche Seefeld" Proceedings of International Society for Photogrammetry And Remote Sensing XX, XX, vol. 18, No. 5/W1, Feb. 25, 2009, pp. 1-8.

(Continued)

*Primary Examiner* — John H Le
(74) *Attorney, Agent, or Firm* — Cesari and McKenna, LLP (57) ABSTRACT

In an example embodiment, a process may select high density points from a point cloud. The process may create one or more clusters from the high density points and identify a circular cluster from the created clusters. The process may identify which points in the circular cluster are inner edge points and determine a center of an ellipse that fits the inner edge points. The process may define a search space utilizing the center of the ellipse. The process may determine the estimated x, y, and z coordinates for the position of the scanner in the search space utilizing a non-linear least square solver with different combinations of a relationship that is true for any pair of points of the cluster. An application may utilize the determined position with an object/file format (e.g., LSA format) to generate a high resolution 3D mesh of a scene.

21 Claims, 8 Drawing Sheets

(51) Int. Cl.
  *G01S 7/497* (2006.01)
  *G01S 17/42* (2006.01)
  *G01S 17/89* (2020.01)
  *G06T 7/60* (2017.01)
(52) U.S. Cl.
  CPC ............... *G06T 7/60* (2013.01); *G06T 7/73* (2017.01); *G06T 2207/10028* (2013.01)
(58) Field of Classification Search
  USPC ........................................................ 702/152
  See application file for complete search history.

(56) References Cited

U.S. PATENT DOCUMENTS

| | | | |
|---|---|---|---|
| 9,934,590 | B1 | 4/2018 | Cheng |
| 2016/0073081 | A1* | 3/2016 | Becker .................... G01S 7/51 348/43 |
| 2018/0313956 | A1 | 11/2018 | Rzeszutek et al. |
| 2019/0018680 | A1 | 1/2019 | Charamisinau et al. |
| 2019/0124317 | A1 | 4/2019 | Rivas Perpen et al. |
| 2019/0155973 | A1* | 5/2019 | Morczinek ............... G06N 3/08 |
| 2019/0235083 | A1* | 8/2019 | Zhang ...................... G01S 7/51 |
| 2020/0043186 | A1 | 2/2020 | Selviah et al. |
| 2020/0126208 | A1* | 4/2020 | Ponto ..................... G06T 19/20 |

OTHER PUBLICATIONS

D. D. Lichti, "The Impact of Angle Parameterisation on Terrestrial Laser Scanner Self-Calibration" Jan. 1, 2009, retrieved from the internet: URL: https://pdfs.semanticscholar.org/a305/02dad18cflf9a061f8ef7038e55755ba0863.pdf [retrieved on Nov. 8, 2019].

Extended European Search Report dated Nov. 20, 2019 for European Patent Application No. 19305648.8 for Bentley Systems, Inc., 22 pages.

S. Bechtold et al., "Helios: A Multi-purpose LIDAR Simulation Framework for Research, Planning and Training of Laser Scanning Operations with Airborne, Ground-based Mobile and Stationary Platforms," ISPRS Annals of Photogrammetry, Remote Sensing and Spatial Information Sciences, vol. III-3, Jun. 3, 2016, pp. 161-168.

Berger et al., "A Survey of Surface Reconstruction from Point Clouds", vol. 36, No. 1, Jan. 1, 2017, pp. 310-329.

Novel et al., "Comparing Aerial Photogrammetry and 3D Laser Scanning Methods for Crating 3D Models of Complex Objects. A Bentley Systems White Paper", Apr. 30, 2016, pp. 1-9, retrieved from the Internet: URL:https://www.bentley.com/*/asset/14/9089.ashx [retrieved on Jun. 15, 2020].

Extended European Search Report dated Jul. 2, 2020 for EP Application No. 19306500.0-1222 for Gbaguidi Aisse, Alexandre, et al., 7 pages.

* cited by examiner

DETERMINING ONE OR MORE SCANNER POSITIONS IN A POINT CLOUD

RELATED APPLICATIONS

The present application claims the benefit of EP Patent Application No. 19 305 648.8 titled DETERMINING ONE OR MORE SCANNER POSITIONS IN A POINT CLOUD, filed on May 22, 2019, the contents of which are incorporated herein in their entirety.

BACKGROUND

Technical Field

The present disclosure relates generally to processing point clouds, and more specifically to determining one or more scanner positions in a point cloud to process the point cloud.

Background Information

Particular applications, e.g., the ContextCapture™ application available from Bentley Systems, Inc., may automatically generate a high-resolution 3D mesh of a scene from photographs and/or from one or more point clouds as captured by scanners, e.g., Light Detection and Ranging (LiDAR) scanners. In order to reconstruct point clouds acquired from the scanners, the particular applications may need to know the position of each scanner in the environment, i.e., scene. The position information of each scanner is not always available and/or present in the metadata of some file/object formats (e.g. LAS file format). Therefore, and according to traditional techniques, the file/object formats cannot be processed by the applications to generate the high-resolution 3D mesh of the scene because of the missing scanner position information.

SUMMARY

Techniques are provided for determining one or more scanner positions in a point cloud. In an embodiment, one or more scanners, such as LiDAR scanners, may scan a scene to capture a point cloud. A process may utilize the position information (e.g., x, y, and z coordinates) of the points of the point cloud to determine the position of the one or more scanners according to one or more embodiments described herein.

Specifically, and for each scanner, the process may identify high density regions of the point cloud, and select particular points of the point cloud determined to be high density points. For example, the process may utilize the mean distance from a point to its neighbors to compute a density value of the point, where a low density value is indicative of high density and a high density value is indicative of low density. The process may compare the density value of the point with the density values of the other points of the point cloud to determine if the point is a high density point.

The process may cluster, e.g., group together, the high density points to differentiate between parts of the scene for which the point cloud is captured. For example, the process may utilize a principal component analysis (PCA) algorithm to compute a non-oriented normal value and a curvature value for each high density point to cluster together the high density points that are on a flattest surface and that lie on the same plane. The process may discard non-clustered high density points and clusters determined to be too small (e.g., associated with noise).

The process may then identify a circular cluster (e.g., a circular shaped cluster) from the created clusters. The circular cluster may be a direct effect of the manner in which the scanner operates. Specifically, LiDAR scanners are rotating devices that scan the environment, i.e., scene, in all directions. Because of the limitations of the scanner's optics and mechanics, the scanner may be unable to scan below a particular elevation angle, and often the closest object scanned is the ground that is generally flat. Thus, the circular cluster may represent a scan of the ground surrounding the scanner at the lowest elevation angle.

The process may compute a centroid for each cluster, and utilize the density value of the centroid with respect to the density values of the points of the cluster to determine if the cluster is circular in shape. Specifically, and for a circular cluster, the density value of the centroid will typically be different from the density values of the points of the circular cluster because the centroid is "external" to the points of the circular cluster. However, and with other shaped clusters (e.g., line), the density value of the centroid will typically be similar to the density values of the points of the other shaped cluster because the centroid is "among" the points of the other shaped cluster. The process may determine that the cluster is a circular cluster if, for example, the density value of the centroid is greater than, by some factor (e.g., 11 times), the density value of the point determined to have the maximum density value of the cluster.

The process may then identify the inner edge points of the circular cluster. The process may compute a centroid for each point in the circular cluster utilizing a certain number of the point's neighbors in the entire point cloud. The process may utilize the relationship between a distance from the centroid of the circular cluster to the point and the distance from the centroid of the circular cluster to the centroid of the point to determine if the point is an inner edge point. Specifically, the process may determine that the point is not an inner edge point if the distances are relatively the same.

Once the inner edge points of the circular cluster are identified, the process may utilize the x and y coordinates for each inner edge point with a known least-square algorithm to determine the equation for the ellipse that fits the inner edge points of the circular cluster. The process may then determine the center of the ellipse in a known manner. The process may then utilize the center of the ellipse to define a search space.

To determine the x, y, and z, coordinates of the position of the scanner within the defined search space, the process may utilize a non-linear least square solver. Specifically, and because objects that are closer to the scanner are more densely scanned than objects that are farther away, the following relationship for any two points (i.e., subscript 1 and 2) of the cluster is true:

$$\frac{d_1 * r_1^2}{\cos(\alpha_1)} = \frac{d_2 * r_2^2}{\cos(\alpha_2)}$$

Where d represents the density value of the point, r represents the distance between the scanner and the point, and a represents the angle between the normal of the point and the direction from the point to the scanner.

The process may select N number of points from the circular cluster with different densities, and utilize different combinations, e.g., N(N-1)/2 different combinations, of the above equation for the N points with the non-linear least square solver to determine the x, y, and z, coordinates of the position of the scanner within the defined search space.

Therefore, the operating characteristics of the scanner, which captures the circular cluster surrounding the scanner, are leveraged by the one or more embodiments described herein to determine the position of the scanner. For simplicity purposes, reference may be made to determining the position of a single scanner in a point cloud. However, it is expressly contemplated that the position of multiple scanners in a point cloud may be determined, in parallel or serially, according to one or more embodiments described herein. The process may create one or more data structures, e.g., one or more scanner position data structures, which store an association between an identifier of each scanner and the determined position of each scanner.

Advantageously, particular applications, e.g., ContextCapture™, which require that the positions of the scanner be known, may process object/file formats (e.g., LAS file format) missing the position information. For example, the application may receive a LAS file containing the point cloud (i.e., point cloud data) captured for a scene from multiple scanners. The application may process the LAS file, utilizing the positions of the scanners determined according to one or more embodiments described herein, to generate a high-resolution 3D mesh of the scene. Therefore, the one or more embodiments described herein provide an improvement in the existing technological field of point cloud processing since the particular applications, that require that the position of the scanner be known, can process the LAS file with the positions of the scanners determined according to one or more embodiments described herein. In addition, the one or more embodiments described herein have a practical application since the particular applications, that require that the position of the scanner be known, can process the LAS file with the positions of the scanners determined according to one or more embodiments described herein.

In addition, because one or more embodiments described herein rely on the densities of the points and objects that are closer to a scanner are more densely scanned than objects that are farther away, the determination of a scanner's position is not negatively impacted by a different scanner being located in the scene and in close proximity. That is, the densities of the points of the circular shaped cluster that surrounds the scanner are relatively high in comparison to the densities of the points included in the point cloud because of, for example, the different scanner being located in the scene and in close proximity (e.g., 5 meters away). As such, the one or more embodiments described herein are still capable of accurately determine the position of the one or more scanners in the point cloud even when a different scanner is located in the scene and in close proximity.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
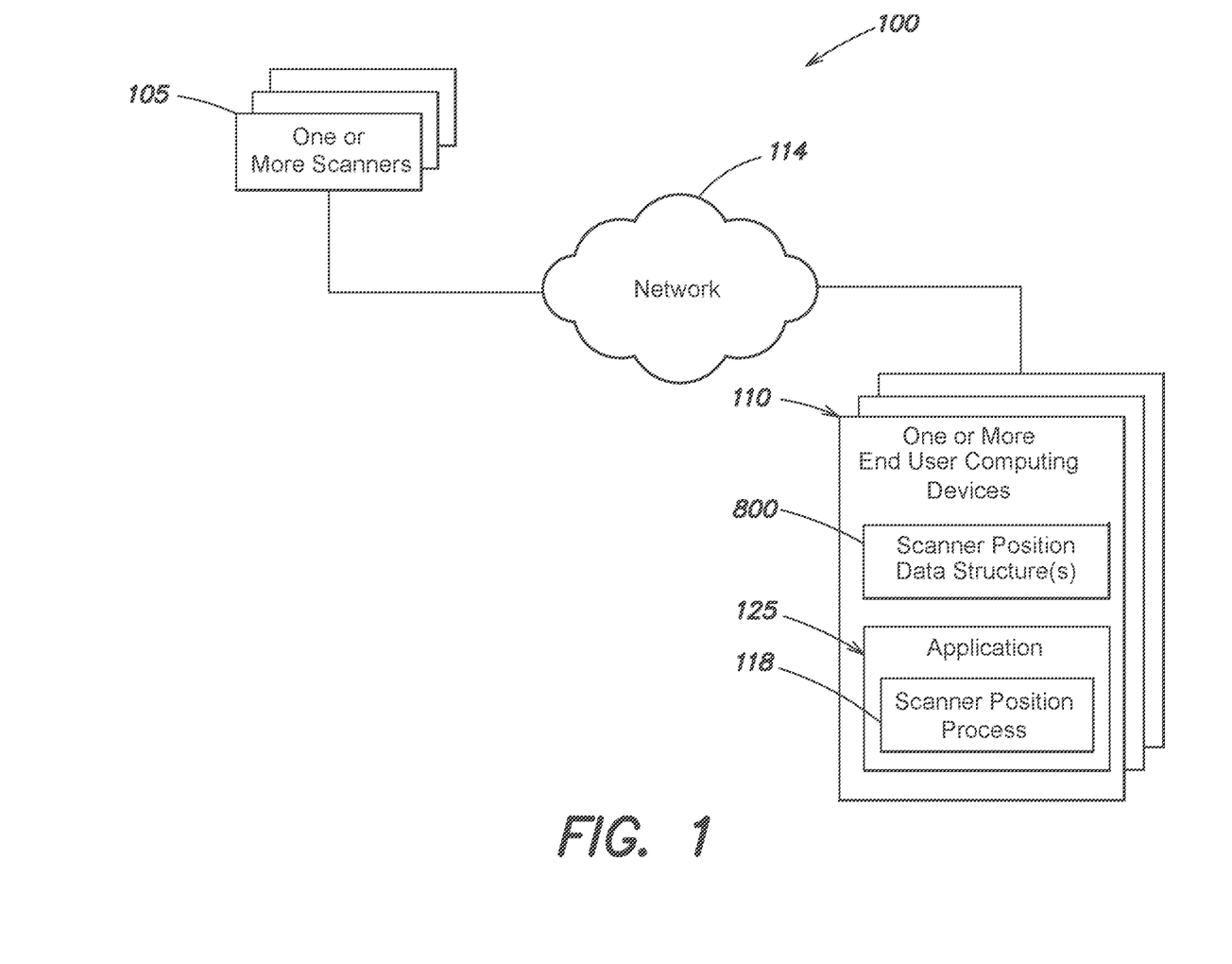
FIG. 1 is a high-level block diagram of an example environment according to one or more embodiments described herein.

FIG. 1 is a high-level block diagram of an example environment 100 according to one or more embodiments described herein. In an embodiment, the environment 100 includes one or more scanners 105 and one or more end user computing devices 110 that may communicate via network 114. The one or more scanners 105 may be, for example, LiDAR scanners, or other type of scanners that capture source data, such as a point cloud, that includes a plurality of points in space representing the external surfaces of objects in a scene in which the scanners 105 are located and operating.

Figure 8:
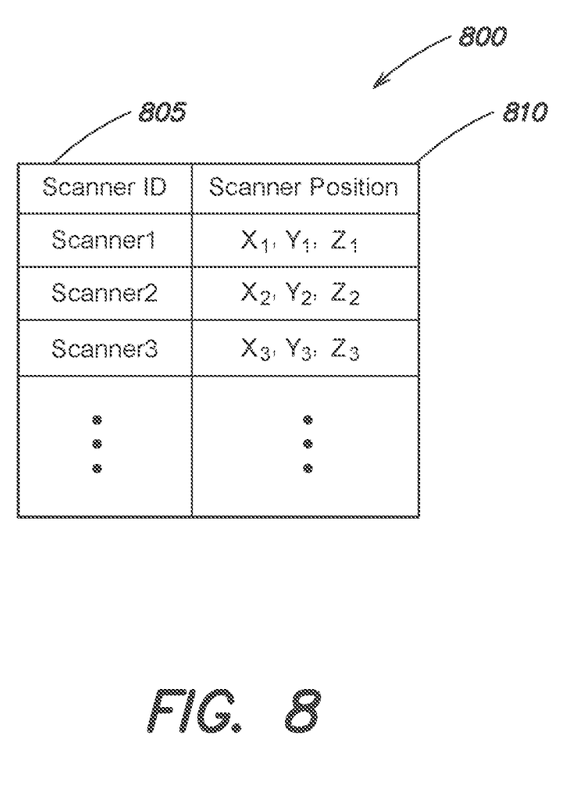
FIG. 8 is an exemplary scanner position data structure according to one or more embodiment described herein.

Each end user computing device 110 in environment 100 may include processors, memory, storage systems, and other hardware (not shown). The one or more end user computing devices 110 may include one or more graphical user interfaces (GUIs) that allows a user to interact with an application 125 executing on the end user computing device 110. The application 125 may be, but is not limited to, 3D modeling software. For example, the 3D modeling software may be the ContextCapture™ application available from Bentley Systems, Inc., which processes point clouds to generate high-resolution 3D meshes of a scene. The application 125 may receive the point clouds from the one or more scanners 105 over the network 114. Alternatively, the end user computing device 110 may receive the point cloud in any of a variety of different ways. For example, the point cloud may be stored on a storage device (e.g., solid-state drive (SSD), hard drive, etc.) and transferred to the end user computing device 110. The application 125 may include scanner position process 118 that implements one or more embodiments described herein. Specifically, the scanner position process 118 may determine the positions of the scanners 105 in a point cloud according to one or more embodiments described herein. The end user computing device 110 may store scanner position data structure(s) 800 that stores an association between an identifier of each scanner 105 in the point cloud and the position of each scanner determined according to the one or more embodiments described herein. The application 125 may then utilize the positions of the scanners 105, determined according to the one or more embodiments described herein, to process a point cloud and generate a 3D mesh of a scene in which the scanners 105 are located and operating.

Figure 2:
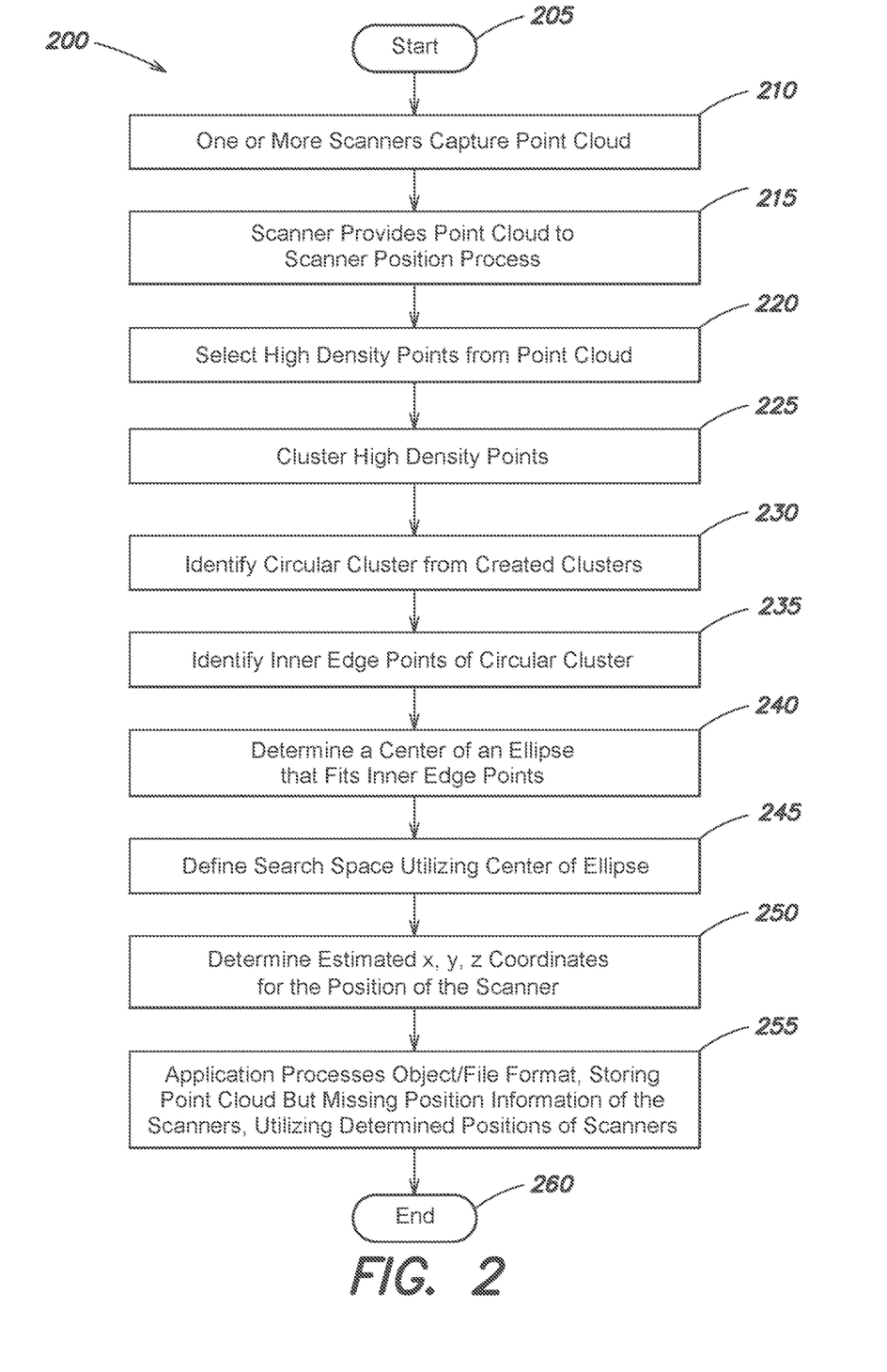
FIG. 2 is a flow diagram of a sequence of steps for determining one or more scanner positions in a point cloud according to one or more embodiments described herein.

FIG. 2 is a flow diagram of a sequence of steps for determining one or more scanner positions in a point cloud according to one or more embodiments described herein.

For simplicity purposes, the examples described herein may refer to determining the position of a single scanner 105, however it is expressly contemplated that the embodiments described herein may determine, in parallel or serially, the positions of multiple scanners 105 in a point cloud according to one or more embodiments described herein.

Figure 3:
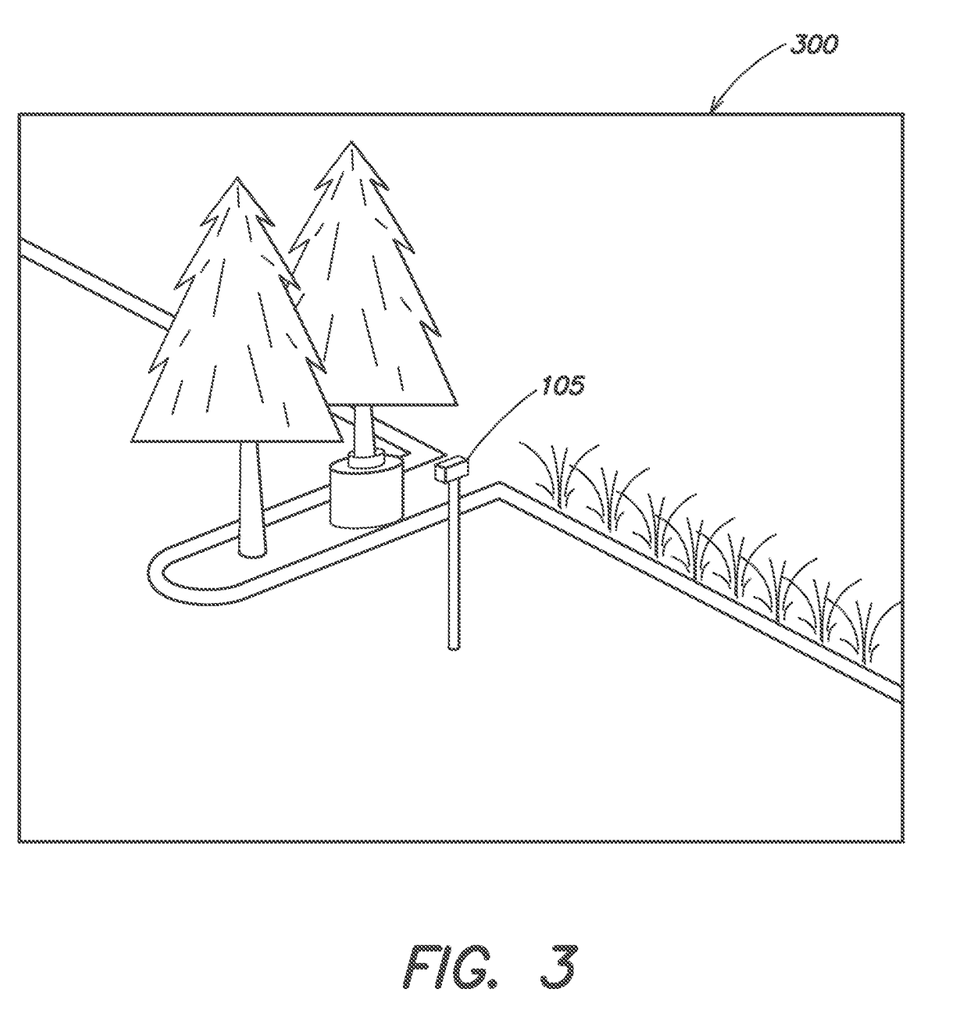
FIG. 3 is a diagram illustrating an example scene in which a scanner is located and operating according to one or more embodiments described herein.

The procedure 200 starts at step 205 and continues to step 210 where one or more scanners 105 capture a point cloud of a scene. FIG. 3 is a diagram illustrating an example scene in which a scanner 105 is located and operating according to one or more embodiments described herein. Scanner 105 may operate in scene 300 that, for example, includes a plurality of objects (e.g., trees, bushes, sidewalks, etc.). The scanner 105 may be a LiDAR scanner that captures a point cloud that includes a plurality of points in space representing the external surfaces of the objects in scene 300. For example, the scanner 105 may rotate to scan the scene 300 in all directions. Objects that are closer to the scanner may capture more densely than objects that are farther away. In addition, and because of the limitations of the optics and mechanics associated with the scanner 105, the scanner may be unable to scan below a particular elevation angle, and often the closest object scanned is the ground that is generally flat. The point cloud captured from the scan of scene 300 may include a plurality of points that each having a position (e.g., x, y, and z coordinates) relative to the scanner 105. At step 215, a scanner 105 provides the point cloud to the end user computing device 110, and more specifically, to the scanner position process 118 of the end user computing device 110. For example, the scanners 105 may provide the point cloud to the end user computing device 110 over the network 114. Alternatively, the end user computing device 110 may receive the point cloud in any of a variety of different ways. For example, the point cloud may be stored on a storage device (e.g., solid-state drive (SSD), hard drive, etc.) and transferred to the end user computing device 110.

The procedure continues to step 220, and the scanner position process 118 selects high density points from the point cloud. Specifically, the scanner position process 118 may compute the mean distance from each point of the point cloud to a number of k nearest neighbors to identify high density regions in the point cloud. In an embodiment, k may be a number from 15 to 50. For example, and for a selected point of the point cloud, the scanner position process 118 may utilizes the x, y, and z coordinates for the selected point and the x, y, and z coordinates of each of the other points of the point cloud to determine the k, e.g., 50, nearest neighbors of the selected point. The k, e.g., 50, nearest neighbors in a point cloud may be referred to as a "local neighborhood." The scanner position process 118 may compute a sum of the distances from the selected point to each of its k, e.g., 50, nearest neighbors and then divide the sum by k, e.g., 50, to compute the mean distance for the selected point that is indicative of the density of the neighborhood (e.g., high density region or not). The mean distance for the selected point may represent the density value for the selected point, where a low density value is indicative of high density and a high density value is indicative of low density. The scanner position process 118 may compute the density for each point of the point cloud.

The scanner position process 118 may then select a particular number of points from the point cloud that are determined to be high density points. Specifically, the scanner position process 118 may select a percentage (x) of the densest points of the point cloud. For example, x may be 1% (threshold percentage) and the scanner position process 118 may determine which points have computed density values that are in the lowest 1% (threshold percentage) of all the compute density values in the point cloud (e.g., top 1% of densest points in point cloud), and then select those points as the high density points. The points selected based on the threshold percentage are the high density points as determined by the scanner position process 118.

Figure 4:
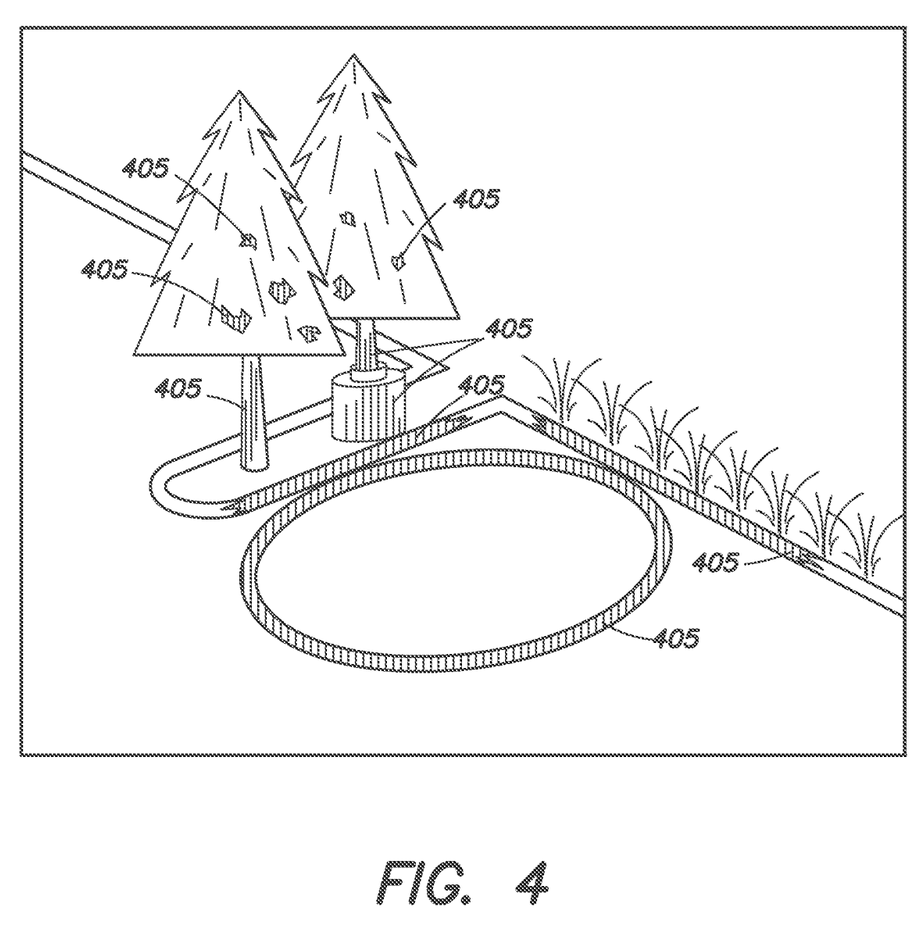
FIG. 4 is a diagram illustrating a scene highlighted with high density points according to the one or more embodiments described herein.

FIG. 4 is a diagram illustrating a scene highlighted with high density points according to the one or more embodiments described herein. As depicted in FIG. 4, the high density points 405 determined by the scanner process 118 correspond to particular surfaces in scene 300. That is, the points of the point cloud determined to be high density points 405, e.g., top 1% of the densest points of the points cloud, correspond to particular surfaces in the scene 300. As depicted in FIG. 4, the high density points correspond to the surfaces on the ground, sidewalks, trees, branches/leaves, etc. For simplicity purposes, the scanner 105 has been removed from the scene 300 in FIG. 4.

The procedure continues to step 225 and the scanner position process 118 clusters, e.g., groups together, the high density points to differentiate between parts of the scene for which the point cloud is captured. Specifically, the scanner position process 118 may implement a known PCA algorithm to compute a non-oriented normal value and a curvature value for each high density point. More specifically, and for a particular high density point, the PCA algorithm computes a non-oriented normal value and a curvature value based on the local neighborhood (i.e., k nearest neighbors) of the particular high density point. The computed curvature value for the particular high density point represents a flatness of the local neighborhood associated with the particular high density point. That is, the local neighborhood of the particular high density point (i.e., the k nearest neighbors of the particular high density point) corresponds to a particular surface in the scene, and the curvature value represents the flatness of the particular surface in the scene. For example, a curvature value of 0 may indicate that particular surface is flat, while a curvature value of ⅓ may indicate that the particular surface is not flat.

To create a first cluster, the scanner position process 118 may select a high density point with a curvature value closest to 0, i.e., the flattest point of the high density points, and that is less than 0.1. The scanner position process 118 may then add a different point, of the high density points, to the first cluster if three conditions are met. The first condition is that the absolute value of the dot product of the computed non-oriented normal value for the selected point with the lowest curvature value (e.g., closest to 0) and the computed non-oriented normal value for the different point is greater than 0.8. This condition ensures that the points of the cluster share a coherent normal orientation. The second condition is that the absolute value of the dot product of the computed non-oriented normal value for the selected point and a computed non-oriented normal value for a sub-cluster including 29 random points of the cluster and the different point is greater than 0.8. If there are less than 29 points in the cluster, the second condition is that the absolute value of the dot product of the computed non-oriented normal value for the selected point and a computed non-oriented normal value for a sub-cluster including all the points in the cluster and the different point is greater than 0.8. The second condition ensures that the different point lies on the same plane as the selected point with the lowest curvature value. The third condition is that the different point has not already been assigned to a cluster. The third condition ensures that once a point is assigned to a cluster, it cannot be reassigned. All of the different high density points that meet these three conditions are added to the first cluster that includes the selected point with the lowest curvature value.

The scanner position process 118 may create additional clusters in a similar manner. Specifically, the scanner position process 118 may select a high density point not within an already created cluster and with a curvature value closest to 0 and that is less than 0.1, and then add different high density points when the three conditions are met. The scanner position process 118 creates additional clusters until there are no remaining high density points with a curvature value that is less than 0.1. The scanner position process 118 may then discard all non-clustered points, i.e., the high density points not within a created cluster.

The scanner position process 118 may also discard clusters that are classified as noises, e.g., clusters that are too small. Specifically, the scanner position process 118 may determine that all clusters that have less than a certain number of points are to be classified as noise and discarded. The scanner position process 118 may utilize any of a variety of different thresholds and/or algorithms in determining that a cluster is too small. For example, the scanner position process 118 may be configured to discard all clusters that include a number of points that is less than or equal to 0.2% of the number of high density points. Therefore, if 1000 high density points are identified, all clusters that have two or less points will be discarded.

Figure 5:
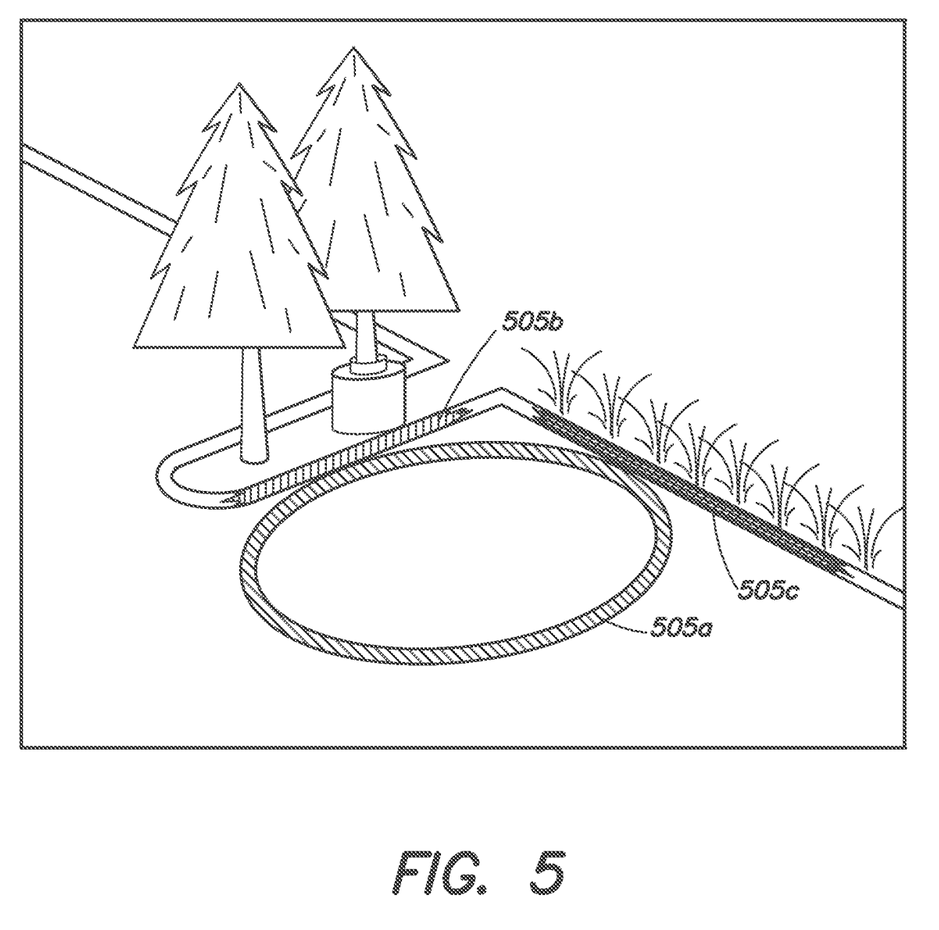
FIG. 5 is a diagram illustrating a scene highlighted based on the clustering according to the one or more embodiments described herein.

FIG. 5 is a diagram illustrating a scene highlighted based on the clustering according to one or more embodiments described herein. As depicted in FIG. 5, each of the clusters 505*a*, 505*b*, and 505*c* are formed to differentiate between parts, e.g., surfaces, in the scene 300. In addition and as part of the clustering, non-clustered points and clusters determined to be too small, e.g., noise, are removed. Specifically, and as shown in FIG. 4, there are particular high density points located on the surfaces of the trees, branches/leaves, etc. Based on the clustering as performed by the scanner position process 118, these high density points are determined to be either non-clustered points or part of a cluster that is determined to be too small. As such, these high density points are discarded. Thus, each cluster (505*a*, 505*b*, and 505*c*) is determined to be sufficiently large (e.g., not noise), include points that lie on the same plane (e.g., z coordinate is constant for points of the cluster), and include points that lie on the same surface (e.g., share a coherent normal orientation). For simplicity purposes, the scanner 105 has been removed from the scene 300 in FIG. 5.

The procedure continues to step 230 and the scanner position process 118 identifies a circular cluster (e.g., the created cluster is circular in shape) from the created clusters. The circular cluster may be a direct effect of the manner in which the scanner 105 operates. Specifically, LiDAR scanners are rotating devices that scan the environment, i.e., scene, in all directions. Because of the limitations of the scanner's optics and mechanics, the scanner may be unable to scan below a particular elevation angle, and often the closest object scanned is the ground that is generally flat. Thus, the circular cluster may represent a scan of the ground surrounding the scanner at the lowest elevation angle.

The scanner position process 118 may compute a centroid for each cluster, e.g., 505*a*, 505*b*, and 505*c*. Specifically, the scanner position process 118 may compute the average of the x, y, and z, coordinates for all of the points of the cluster to compute the centroid of a cluster. The scanner position process 118 may then compute a density value for the centroid of the cluster. Specifically, the scanner position process 118 may compute the mean distance from the centroid to its k nearest neighbors of the cluster. For example and if k is 50, the scanner position process 118 sums the distances from the centroid to its 50 nearest neighbors and then divides the sum by 50. The scanner position process 118 may compare the density value of the centroid with the density values of the other points of the cluster to determine if the cluster is a circular cluster or not.

Specifically, and for a circular cluster, the centroid will be external to the points of the cluster, e.g., not among the points of the cluster. For example, the centroid of a circular shaped cluster will be in a middle area, and thus the distance from the centroid of the circular cluster to each point of the cluster will be a relatively large value when compared to the distances between the points of the cluster. As such, the centroid will have a low density (e.g., high density value) when compared to the densities of the points of the circular cluster. With other shaped clusters, such as a line (e.g., 505*b* and 505*c*), the centroid will be among the points of the cluster. As such, the density of the centroid will be relatively similar to the densities of the points of the other shaped clusters. Therefore, the scanner position process 118 may determine that a cluster is a circular cluster if the density value of the centroid is a threshold amount greater than the density value of one or more points of the cluster. For example, the scanner position process 118 may determine that a cluster is circular cluster if the density value of the centroid is 11 times greater than the density value of the point determined to have the maximum density value of the cluster.

Figure 6:
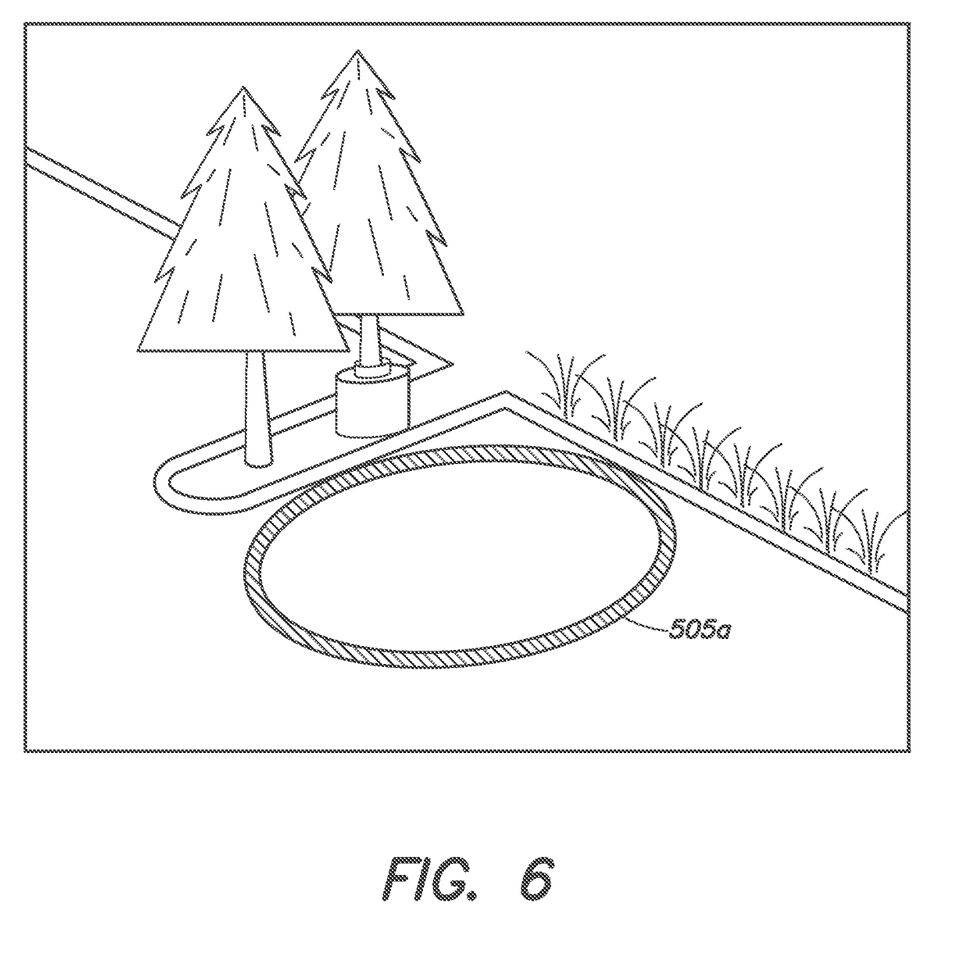
FIG. 6 is a diagram illustrating a scene highlighted based on identifying a circular cluster according to the one or more embodiments described herein.

FIG. 6 is a diagram illustrating a scene highlighted based on identifying a circular cluster according to one or more embodiments described herein. The circular cluster 505*a* is captured based on the rotating scan by the scanner 105 of the ground. Based on the determination that cluster 505*a* is a circular cluster and clusters 505*b* and 505*c* of FIG. 5 are not, clusters 505*b* and 505*c* are discarded. As such, FIG. 6 only includes the circular cluster 505*a*. For simplicity purposes, the scanner 105 has been removed from the scene 300 in FIG. 6.

The procedure continues to step 235 and the scanner position process 118 identifies the inner edge points of the circular cluster. To determine if a point is an inner edge point, the scanner position process 118 may utilize the relationship between a distance from a centroid of the circular cluster to the point and the distance from the centroid of the circular cluster to a centroid of the point. The process may determine that the point is not an inner edge point if the distances are relatively the same.

Specifically, the scanner position process 118 may compute the mean density of the circular cluster (MD). For example, the scanner position process 118 may sum together the densities of each point of the circular cluster and then divide the sum by the total number of points of the circular cluster to compute the mean density. The scanner position process 118 may also compute the centroid for each point in the circular cluster. To compute the centroid for a particular point in the circular cluster, the scanner position process 118 may first determine the particular point's k, e.g., 50, nearest neighbors of the point cloud (e.g., not in the circular cluster). The scanner position process 118 may then determine the average of the x, y, and z, coordinates for the k, e.g., 50, nearest neighbors to compute the centroid for the particular point (local centroid).

The scanner position process 118 may then compute the distance between the local centroid and the particular point (d1). In addition, the scanner position process 118 may compute the distance between the local centroid and the centroid of the circular cluster (d2). The scanner position process 118 may then determine that the particular point is an inner edge point of the circular cluster if d1+0.85*MD<d2.

The mean density is used as a buffer for noise. The formula takes advantage of the fact that for a point that is not an inner edge point, the distance from the cluster centroid to the local centroid and the distance from the cluster centroid to the particular point will be relatively similar. Specifically, a centroid of a point that is not an inner edge point will be in close proximity to the point, while the centroid of a point that is inner edge point will be shifted in a direction relative to the point (0.85*MD allows for a buffer distance and takes into account noise inherent to point clouds). The scanner position process 118 may utilize this formula for each point of the circular cluster to identify if each point of the circular cluster is an inner edge point or not.

Figure 7:
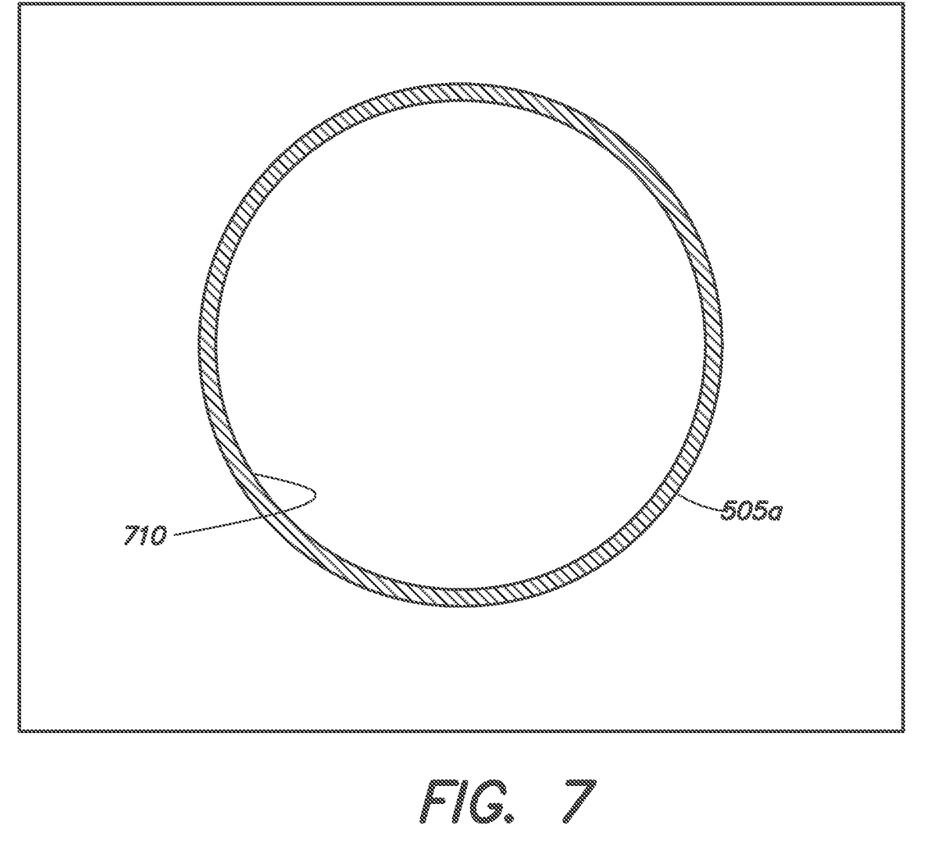
FIG. 7 is a diagram illustrating the identification of inner edge points according to the one or more embodiments described herein.

FIG. 7 is a diagram illustrating the identification of inner edge points according to one or more embodiments described herein. As depicted in FIG. 7, the circular cluster 505a includes an inner circle 710 indicating the inner edge points of the circular cluster 505a that are identified by the scanner position process 118.

The procedure continues to step 240 and the scanner position process 118 determines a center of an ellipse that fits the inner edge points. Specifically, the scanner position process 118 assumes that the ground is flat and projects the inner edge points on a 2-d plane, (i.e., the x and y coordinates of the inner edge points are considered without considering the z coordinates). More specifically, and to project the inner edge points on a 2-d plane, the scanner position process 118, in a known manner, computes a mean plane for the circular cluster using a known PCA algorithm, rotates the cluster so that the computed mean plane is horizontal, and then flattens the inner edge points such that the z coordinates are irrelevant. The scanner position process 118 may then utilize the x and y coordinates for each inner edge point with a known least-square algorithm to determine the equation for the ellipse that fits the inner edge points of the circular cluster. The scanner position process 118 may then determine the center of the ellipse in a known manner.

The procedure continues to step 245 and the scanner position process 118 defines a search space utilizing the center of the ellipse. Specifically, the scanner position process 118 may utilize the center of the ellipse to set an initial position of the scanner 105. For example, the scanner position process 118 may set the initial position of the scanner 105 to be:

scanX=ellX, scanY=ellY, and scanZ=ellZ+0.85, where scanX is the initial x coordinate of the position of the scanner 105, scanY is the initial y coordinate of the position of the scanner 105, scanZ is the initial z coordinate of the position of the scanner 105, ellX is the x coordinate of the center of the ellipse, ellY is the y coordinate of the center of the ellipse, and ellZ is the z coordinate of the center of the ellipse.

The scanner position process 118 may then set the search space as follows:

scanX is between ellX−0.1 and ellX+0.1, scanY is between ellY−0.1 and ellY+0.1, and scanZ is between ellz+0.3 and ellz+2.

Therefore, the scanner position process 118 leverages the fact that a scanner in a point cloud is typically between 0.3 meters and 2 meters off the ground, and also allows for the x and y coordinates to vary in a range of +/−0.1 meters. Thus, and by defining the search space in this manner, the scanner position process 118 may determine, in a more efficient manner (optimization) and according to one or more embodiments described herein, the x, y, and z, coordinates of the position of the scanner 105.

The procedure continues to step 250 and the scanner position process 118 determine the x, y, z coordinates of the position of the scanner 105 within the defined search space utilizing a non-linear least square solver. For example the non-linear least square solver may be the Ceres Solver available from Google, Inc. Specifically, and because objects that are closer to the scanner are more densely scanned than objects that are farther away, the following relationship for any two points (i.e., subscript 1 and 2) of the cluster is true:

$$\frac{d_1 * r_1^2}{\cos(\alpha_1)} = \frac{d_2 * r_2^2}{\cos(\alpha_2)}$$

Where d represents the density value of the point, r represents the distance between the scanner and the point, and a represents the angle between the normal of the point and the direction from the point to the scanner.

The scanner position process 118 may select N number of points from the circular cluster with different densities, and utilize different combinations, e.g., N(N-1)/2 different combinations, of the above equation for the N points with the non-linear least square solver to determine the x, y, z coordinates of the position of the scanner 105 within the search space. For example, if N is 6, the following different combinations may be utilized with the non-linear solver to compute the values for $r_1$-$r_6$, where each different subscript number represents one of the 6 different points with different densities.

$$\frac{d_1 * r_1^2}{\cos(\alpha_1)} = \frac{d_2 * r_2^2}{\cos(\alpha_2)}$$

$$\frac{d_1 * r_1^2}{\cos(\alpha_1)} = \frac{d_3 * r_3^2}{\cos(\alpha_3)}$$

$$\frac{d_1 * r_1^2}{\cos(\alpha_1)} = \frac{d_4 * r_4^2}{\cos(\alpha_4)}$$

$$\frac{d_1 * r_1^2}{\cos(\alpha_1)} = \frac{d_5 * r_5^2}{\cos(\alpha_5)}$$

$$\frac{d_1 * r_1^2}{\cos(\alpha_1)} = \frac{d_6 * r_6^2}{\cos(\alpha_6)}$$

$$\frac{d_2 * r_2^2}{\cos(\alpha_2)} = \frac{d_3 * r_3^2}{\cos(\alpha_3)}$$

$$\frac{d_2 * r_2^2}{\cos(\alpha_2)} = \frac{d_4 * r_4^2}{\cos(\alpha_4)}$$

$$\frac{d_2 * r_2^2}{\cos(\alpha_2)} = \frac{d_5 * r_5^2}{\cos(\alpha_5)}$$

$$\frac{d_2 * r_2^2}{\cos(\alpha_2)} = \frac{d_6 * r_6^2}{\cos(\alpha_6)}$$

-continued $$\frac{d_3 * r_3^2}{\cos(\alpha_3)} = \frac{d_4 * r_4^2}{\cos(\alpha_4)}$$

$$\frac{d_3 * r_3^2}{\cos(\alpha_3)} = \frac{d_5 * r_5^2}{\cos(\alpha_5)}$$

$$\frac{d_3 * r_3^2}{\cos(\alpha_3)} = \frac{d_6 * r_6^2}{\cos(\alpha_6)}$$

$$\frac{d_4 * r_4^2}{\cos(\alpha_4)} = \frac{d_5 * r_5^2}{\cos(\alpha_5)}$$

$$\frac{d_4 * r_4^2}{\cos(\alpha_4)} = \frac{d_6 * r_6^2}{\cos(\alpha_6)}$$

$$\frac{d_5 * r_5^2}{\cos(\alpha_5)} = \frac{d_6 * r_6^2}{\cos(\alpha_6)}$$

With the 6 distances (e.g., $r_1$-$r_6$) computed, the scanner position process 118 can determine, using triangulation for example, the x, y, z coordinates of the position of the scanner 105 within the search space.

For simplicity purposes, reference may have been made to determining the position of a single scanner in a point cloud. However, it is expressly contemplated that the position of multiple scanners in a point cloud may be determined, in the manner described herein, in parallel or serially. The scanner position process 118 may create scanner position data structure 800, stored at end user computing device 110, which store an association between an identifier of each scanner in the point cloud and the determined position of each scanner. FIG. 8 is an exemplary scanner position data structure according to one or more embodiment described herein. The scanner position data structure 800 may include a first column 805 that stores an identifier of each scanner in the point cloud and a second column 810 that stores a position of each scanner determined according to the one or more embodiments described herein. The identifier stored in first column 805 may be a serial number of the scanner or a different unique value used to identify the scanner. The position of the scanner stored in the second column 810 may be the x, y, and z, coordinates determined for the scanner according to one or more embodiments described herein.

The procedure continues to step 255 and the application 125 processes the object/file format (e.g., LAS file format), storing the point cloud (e.g., point cloud data) but missing the positions information of the scanners, utilizing the determined position of the one or more scanners 105. By processing the object/file format (e.g., LAS File format) utilizing the determined position, the application may generate a high resolution 3D mesh of the scene.

Advantageously, particular applications, e.g., Context-Capture™, which require that the positions of the scanner be known, may process object/file formats (e.g., LAS file format) missing the position information. Therefore, the one or more embodiments described herein provide an improvement in the existing technological field of point cloud processing since the particular applications, that require that the position of the scanner be known, can process the LAS file with the positions of the scanners determined according to one or more embodiments described herein. In addition, the one or more embodiments described herein have a practical application since the particular applications, that require that the position of the scanner be known, can process the LAS file with the positions of the scanners determined according to one or more embodiments described herein. The procedure ends at step 260.

In addition, because one or more embodiments described herein rely on the densities of the points and objects that are closer to a scanner are more densely scanned than objects that are farther away, the determination of a scanner's position is not negatively impacted by a different scanner being located in the scene and in close proximity. That is, the densities of the points of the circular shaped cluster that surrounds the scanner are relatively high in comparison to the densities of the points included in the point cloud because of, for example, the different scanner being located in the scene and in close proximity (e.g., 5 meters away). As such, the one or more embodiments described herein are still capable of accurately determine the position of the one or more scanners in the point cloud even when a different scanner is located in the scene and in close proximity.

It should be understood that various adaptations and modifications may be readily made to what is described above, to suit various implementations and environments. While it is discussed above that many aspects of the techniques may be implemented by specific software processes (e.g., of an application stored in a non-transitory electronic device readable medium for execution on one or more processors) or on specific hardware devices, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method, comprising:
receiving a point cloud from at least one scanner, wherein the point cloud includes a plurality of points in space representing one or more external surfaces of at least one object in a scene, where each point of the point cloud has a position relative to the at least one scanner;
computing a density value for each point of the point cloud based on a mean distance from the point to a selected number of neighboring points in the point cloud;
selecting a set of points, from the point cloud, determined to be high density points based on the density value determined for each point of the point cloud;
creating one or more clusters from the set of points based on a non-oriented normal value and a curvature value computed for each point of the first set of points;
identifying a selected cluster of the one or more clusters as a circular shaped cluster;
identifying a plurality of inner edge points of the selected cluster;
determining an ellipse that fits the plurality of inner edges points of the selected cluster; and
determining an estimated z coordinate, an estimated y coordinate, and an estimated z coordinate of the scanner utilizing a center of the ellipse and a non-linear least square solver with a threshold number of inner edge points with different density values.

2. The method of claim 1, wherein the selected number of neighboring points is 50 nearest neighboring points of the point.

3. The method of claim 1, wherein each point of the set of points is determined to be a top 1% densest point in the point cloud.

4. The method of claim 1, further comprising computing the non-oriented normal value and the curvature value utilizing a principal component analysis algorithm.

5. The method of claim 1, wherein a selected point in a first cluster of the one or more clusters has a curvature value of less than 0.1.

6. The method of claim 5, wherein
an absolute value of a dot product of the non-oriented normal value for the selected point and the non-oriented normal value for each additional point in the first cluster is greater than 0.8, and
the absolute value of the dot product of the non-oriented normal value for the selected point and the non-oriented normal value for a sub-cluster consisting of 29 random points in the first cluster and each additional point is greater than 0.8.

7. The method of claim 1, wherein identifying that the selected cluster of the one or more clusters is the circular shaped cluster further comprising
determining that a centroid density value of a cluster centroid of the selected cluster is at least 11 times greater than the density value of a particular point in the selected cluster that is a maximum density value of the selected cluster.

8. The method of claim 1, further comprising:
determining a mean density value for the selected cluster;
computing a local centroid for a particular point in the selected cluster based on the position of the selected number of neighboring points of the particular point;
computing a distance between the particular point and the local centroid;
computing a distance between a cluster centroid and the local centroid; and
determining that the particular point is an inner edge point when d1+0.85*MD<d2,
wherein d1 is the distance between the particular point and the local centroid, MD is the mean density value, and d2 is the distance between the cluster centroid and the local centroid.

9. The method of claim 1, further comprising utilizing a least square algorithm to determine an equation for the ellipse fits the plurality of inner edge points.

10. The method of claim 1, wherein the threshold number of inner edge points with different density values is N, and the method further comprising:
utilizing N(N-1)/2 different combinations of $$\frac{d_1 * r_1^2}{\cos(\alpha_1)} = \frac{d_2 * r_2^2}{\cos(\alpha_2)}$$

for the threshold number of inner edge points with the non-linear least square solver, where $d_1$ represents the density value of a first point of the inner edge points with different density values, $r_1$ represents the distance between the scanner and the first point of the inner edge points with different density values, $a_1$ represents an angle between the normal of the first point and a direction from the first point to the scanner, where $d_2$ represents the density value of a second point of the inner edge points with different density values, $r_2$ represents the distance between the scanner and the second point of the inner edge points with different density values, and $a_2$ represents an angle between the normal of the second point and a direction from the second point to the scanner.

11. The method of claim 1, further comprising generating a three dimension model of a scene represented by the point cloud, where the generating is performed utilizing the point cloud with at least the estimated x coordinate, the estimated y coordinate, and the estimated z coordinate of the scanner.

12. A system for determining a scanner position for each of one or more scanners in a point cloud, the system comprising:
processing logic configured to:
receive the point cloud from at least one scanner of the one or more scanners, wherein the point cloud including a plurality of points in space representing one or more external surfaces of at least one object in a scene, where each point of the point cloud has a position relative to the at least one scanner;
compute a density value for each point of the point cloud based a mean distance from the point to a selected number of neighboring points in the point cloud;
select a set of points, from the point cloud, determined to be high density points based on the density value determined for each point of the point cloud;
create one or more clusters from the set of points utilizing a principal component analysis algorithm;
identify a selected cluster of the one or more clusters as a circular shaped cluster;
identify a plurality of inner edge points of the selected cluster;
determine an ellipse that fits the plurality of inner edges points of the selected cluster; and
determine an estimated x coordinate, an estimated y coordinate, and an estimated z coordinate of the scanner utilizing a center of the ellipse and a non-linear least square solver with a threshold number of inner edge points with different density values.

13. The system of claim 12, wherein the selected number of neighboring points is 50 nearest neighboring points of the point.

14. The system of claim 12, wherein each point of the set of points is determined to be a top 1% densest point in the point cloud.

15. The system of claim 12, wherein the processing logic is further configured to compute a non-oriented normal value and the curvature value utilizing the principal component analysis algorithm.

16. The system of claim 15, wherein a selected point in a first cluster of the one or more clusters has a curvature value of less than 0.1.

17. The system of claim 16, wherein
an absolute value of a dot product of the non-oriented normal value for the selected point and the non-oriented normal value for each additional point in the first cluster is greater than 0.8, and
the absolute value of the dot product of the non-oriented normal value for the selected point and the non-oriented normal value for a sub-cluster consisting of 29 random points in the first cluster and each additional point is greater than 0.8.

18. The system of claim 12, wherein when identifying that the selected cluster of the one or more clusters is the circular shaped cluster, the processing logic is further configured to
determine that a centroid density value of a cluster centroid of the selected cluster is at least 11 times greater than the density value of a particular point in the selected cluster that is a maximum density value of the selected cluster.

19. The system of claim 12, wherein the processing logic is further configured to:

- determine a mean density value for the selected cluster;
- compute a local centroid for a particular point in the selected cluster based on the position of the selected number of neighboring points of the particular point;
- compute a distance between the particular point and the local centroid;
- compute a distance between a cluster centroid and the local centroid; and
- determining that the particular point is an inner edge point when d1+0.85*MD<d2,
    - wherein d1 is the distance between the particular point and the local centroid, MD is the mean density value, and d2 is the distance between the cluster centroid and the local centroid.

20. A non-transitory electronic-device readable medium having instructions stored thereon, the instructions when executed by one or more electronic devices operable to:

- receive a point cloud from at least one scanner of the one or more scanners, wherein the point cloud includes a plurality of points in space representing one or more eternal surfaces of at least one object in a scene, where each point in the point cloud has a position relative to the at least one scanner;
- compute a density value for each point of the point cloud;
- select a set of points, from the point cloud, determined to be high density points based on the density value determined for each point of the point cloud;
- create one or more clusters from the set of points utilizing a principal component analysis algorithm;
- identify a selected cluster of the one or more clusters as a circular shaped cluster;
- identify a plurality of inner edge points of the selected cluster;
- determine an ellipse that fits the plurality of inner edges points of the selected cluster; and
- determine an estimated x coordinate, an estimated y coordinate, and an estimated z coordinate of the scanner utilizing a center of the ellipse and a non-linear least square solver with a threshold number of inner edge points with different density values.

21. The non-transitory electronic-device readable medium of claim 20, wherein the selected number of neighboring points is 50 nearest neighboring points of the point.

* * * * *